US012556716B2

(12) United States Patent
Watanabe

(10) Patent No.: US 12,556,716 B2
(45) Date of Patent: Feb. 17, 2026

(54) IMAGE RECORDING APPARATUS AND IMAGE RECORDING METHOD

(71) Applicant: JVCKENWOOD Corporation, Yokohama (JP)

(72) Inventor: Sho Watanabe, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 8 days.

(21) Appl. No.: 18/673,109

(22) Filed: May 23, 2024

(65) Prior Publication Data

US 2024/0314333 A1  Sep. 19, 2024

Related U.S. Application Data

(63) Continuation of application No. PCT/JP2022/031519, filed on Aug. 22, 2022.

(30) Foreign Application Priority Data

Dec. 24, 2021 (JP) .................. 2021-211080
Dec. 24, 2021 (JP) .................. 2021-211081

(51) Int. Cl.
*H04N 19/167* (2014.01)
*H04N 19/17* (2014.01)
*H04R 1/32* (2006.01)

(52) U.S. Cl.
CPC .......... *H04N 19/167* (2014.11); *H04N 19/17* (2014.11); *H04R 1/326* (2013.01); *H04R 2499/13* (2013.01)

(58) Field of Classification Search
CPC ...... H04N 19/167; H04N 19/17; H04R 1/326; H04R 2499/13

(Continued)

(56) References Cited

U.S. PATENT DOCUMENTS

2019/0191128 A1   6/2019   Yamagaki et al.
2019/0238859 A1   8/2019   Yonezawa
(Continued)

FOREIGN PATENT DOCUMENTS

JP    2019134323 A    8/2019
JP    2020123888 A    8/2020
WO    2018/037890 A1  3/2018

OTHER PUBLICATIONS

International Search Report of PCT/JP2022/031519, dated Sep. 20, 2022.

*Primary Examiner* — Dominic D Saltarelli
(74) *Attorney, Agent, or Firm* — PROCOPIO, CORY, HARGREAVES & SAVITCH LLP

(57) ABSTRACT

Provided are an image recording apparatus and the like that can detect a direction of arrival of sound around a vehicle and dynamically set a region corresponding to the detected direction of arrival of the sound as a region of interest.

An image recording apparatus includes: an image acquisition unit that acquires an image capturing the periphery of a vehicle; a sound acquisition unit that acquires sound of the periphery of the vehicle; a sound direction detection unit that detects a direction of arrival of the sound; a region of interest setting unit that sets a region corresponding to the direction of arrival of the sound in the image as a region of interest; and an image encoding unit that performs first encoding processing on the region of interest in the image and perform second encoding processing on a region other than the region of interest in the image.

6 Claims, 14 Drawing Sheets

(58) Field of Classification Search
USPC .......................................................... 375/240
See application file for complete search history.

(56) References Cited

U.S. PATENT DOCUMENTS

| | | | |
|---|---|---|---|
| 2021/0275908 A1* | 9/2021 | Amer | G06T 7/215 |
| 2022/0118997 A1* | 4/2022 | Paus | B60W 50/14 |
| 2023/0096496 A1* | 3/2023 | Shin | G06V 20/56 |
| | | | 381/56 |

* cited by examiner

| DETECTION DIRECTION | DETECTED VOLUME |
|---|---|
| X-AXIS POSITIVE DIRECTION | 3 |
| X-AXIS NEGATIVE DIRECTION | 1 |
| Y-AXIS POSITIVE DIRECTION | 5 |
| Y-AXIS NEGATIVE DIRECTION | 2 |

FIG. 6

IMAGE RECORDING APPARATUS AND IMAGE RECORDING METHOD

CROSS REFERENCE TO RELATED APPLICATION

This application is based upon and claims the benefit of priority from Japanese patent application No. 2021-211080, filed on Dec. 24, 2021 and Japanese patent application No. 2021-211081, filed on Dec. 24, 2021, the disclosures of which is incorporated herein in its entirety by reference.

BACKGROUND

The present embodiment relates to an image recording apparatus and an image recording method.

In recent years, image recording apparatuses for accurately recording the circumstances of accidents or the like have been developed.

Patent Literature 1 discloses a technology related to an image processing apparatus that sets a region of interest (ROI) for an image frame of a dynamic image captured by imaging means, detects a region of a moving body in the image frame, determines whether at least a part of the detected region of the moving body is included in the region of interest, and based on the result of the determination, controls encoding for inside and outside the region of interest of the dynamic image.

CITATION LIST

Patent Literature

[Patent Literature 1] Japanese Unexamined Patent Application Publication No. 2019-134323

SUMMARY

An image recording apparatus such as a dashcam mounted on a vehicle continuously images the periphery of the vehicle, and records a video (hereinafter simply referred to as image) which is an image and a collection of images. In recent years, images captured by image recording apparatuses have higher resolution, and the capacity of image files has increased accordingly.

In the technology disclosed in Patent Literature 1, when a moving body is included in the region of interest, encoding is performed so that the image quality of the region of interest is increased as triggered by the detection of a predetermined sound (e.g., sound of breaking window glass or yelling of person). In this way, by selectively increasing the image quality of the region of interest and relatively reducing the image quality of regions other than the region of interest, it is possible to improve the image quality of necessary regions and reduce the capacity of the image files.

Meanwhile, the present inventors considered detecting a direction of arrival of sound (e.g., impact sound, horn, siren/brake sound, and scream/shouting) around a vehicle equipped with an image recording apparatus such as a dashcam, and dynamically setting the region corresponding to the detected direction of arrival of the sound as a region of interest. In this way, the direction of arrival of sound (e.g., impact sound, horn, siren/brake sound, and scream/shouting) around the vehicle (accident scene or area where abnormality such as road rage incident occurred) can be set as the region of interest, the image quality of the region of interest can be set higher than that of regions other than the region of interest, and the accident scene or the area where abnormality such as a road rage incident occurred can be recorded more clearly. Note that sound around an own vehicle is not limited to an impact sound, a horn, a siren/brake sound, or a scream/shouting, and may be other kinds of sound (e.g., abnormal sound).

However, in Patent Literature 1, the predetermined sound is merely a trigger for performing encoding to increase the image quality of a preset region of interest (not set dynamically). Patent Literature 1 does not disclose any scheme for detecting the direction of arrival of sound around the own vehicle and dynamically setting a region corresponding to the detected direction of arrival of the sound as the region of interest.

Moreover, the present inventors considered detecting a direction of arrival of sound (e.g., impact sound, horn, siren/brake sound, and scream/shouting) around a vehicle equipped with an image recording apparatus such as a dashcam, and dynamically setting an image corresponding to the detected direction of arrival of the sound as an image of interest.

In this way, the direction of arrival of sound (e.g., impact sound, horn, siren/brake sound, and scream/shouting) around the vehicle (accident scene or area where abnormality such as road rage incident occurred) can be set as the image of interest, the image quality of the image of interest can be set higher than that of images other than the image of interest, and the accident scene or the area where abnormality such as a road rage incident occurred can be recorded more clearly.

However, in Patent Literature 1, the predetermined sound is merely a trigger for performing encoding to increase the image quality of a preset region of interest (not set dynamically). Patent Literature 1 does not disclose any scheme for detecting the direction of arrival of sound around the own vehicle and dynamically setting an image corresponding to the detected direction of arrival of the sound as the image of interest.

An image recording apparatus according to the present embodiment includes: an image acquisition unit configured to acquire an image capturing a periphery of a vehicle; a sound acquisition unit configured to acquire sound of the periphery of the vehicle; a sound direction detection unit configured to detect a direction of arrival of the sound; a region of interest setting unit configured to set a region corresponding to the direction of arrival of the sound in the image as a region of interest; and an image encoding unit configured to perform first encoding processing on the region of interest in the image and perform second encoding processing on a region other than the region of interest in the image.

Additionally, another image recording apparatus according to the present embodiment includes: an image acquisition unit configured to acquire a plurality of images capturing a periphery of a vehicle; a sound acquisition unit configured to acquire sound of the periphery of the vehicle; a sound direction detection unit configured to detect a direction of arrival of the sound; an image of interest setting unit configured to set one or more images corresponding to the direction of arrival of the sound among the plurality of images as an image of interest; and an image encoding unit configured to perform first encoding processing on the image of interest among the plurality of images and perform second encoding processing on images other than the image of interest among the plurality of images.

An image recording method according to the present embodiment includes: an image acquisition step of acquiring an image capturing a periphery of a vehicle; a sound acquisition step of acquiring sound of the periphery of the vehicle; a sound direction detection step of detecting a direction of arrival of the sound; a region of interest setting step of setting a region corresponding to the direction of arrival of the sound in the image as a region of interest; and an image encoding step of performing first encoding processing on the region of interest in the image and performing second encoding processing on a region other than the region of interest in the image.

Additionally, another image recording method according to the present embodiment includes: an image acquisition step of acquiring a plurality of images capturing a periphery of a vehicle; a sound acquisition step of acquiring sound of the periphery of the vehicle; a sound direction detection step of detecting a direction of arrival of the sound; an image of interest setting step of setting one or more images corresponding to the direction of arrival of the sound among the plurality of images as an image of interest; and an image encoding step of performing first encoding processing on the image of interest among the plurality of images and performing second encoding processing on images other than the image of interest among the plurality of images.

BRIEF DESCRIPTION OF DRAWINGS

FIG. 6 is an example of volume (detected volume) of sound acquired by a sound acquisition unit 12.

DETAILED DESCRIPTION

Hereinafter, while the present embodiment will be described using embodiments, the disclosure is not limited to the following embodiments. Also, not all the configurations described in the embodiments are essential as means for solving the problem. For clarity of explanation, the following descriptions and drawings have been abbreviated and simplified as appropriate. Note that in each drawing, identical elements are marked with the same reference sign and redundant explanations are omitted.

First Embodiment

Hereinafter, the present embodiment will be described with reference to the drawings.

Figure 1:
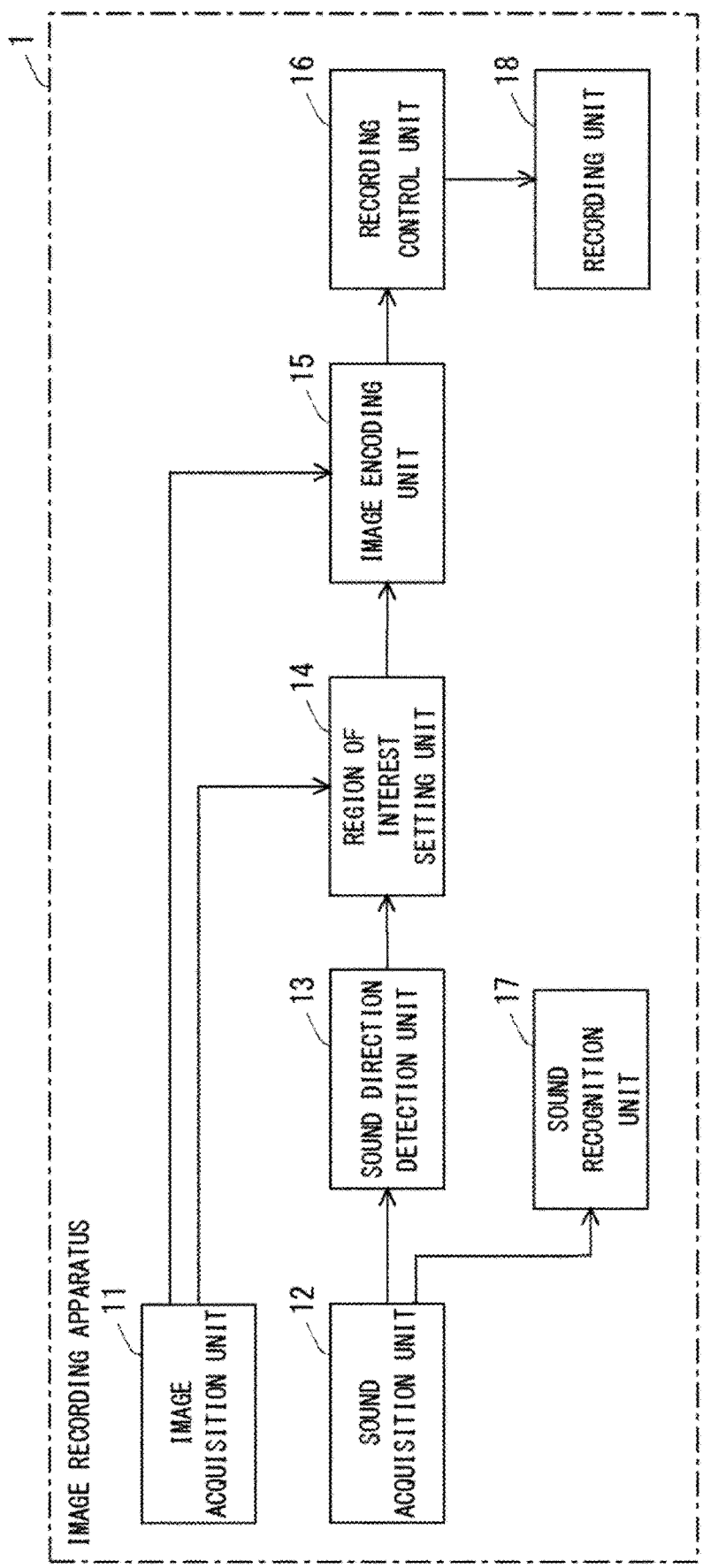
FIG. 1 is a block diagram illustrating a configuration example of an image recording apparatus 1 according to a first embodiment.

FIG. 1 is a block diagram illustrating a configuration example of an image recording apparatus 1 according to a first embodiment. As illustrated in FIG. 1, the image recording apparatus 1 according to the present embodiment includes an image acquisition unit 11, a sound acquisition unit 12, a sound direction detection unit 13, a region of interest setting unit 14, an image encoding unit 15, a recording control unit 16, a sound recognition unit 17, and a recording unit 18.

The image recording apparatus 1 is an apparatus mounted on a vehicle V (see FIG. 2, hereinafter also referred to as own vehicle V), and is a dashcam, for example. The image recording apparatus 1 records an image acquired by the image acquisition unit 11 in the recording unit 18. The image recorded at this time is encoded in the image encoding unit 15. In the present embodiment, the recording unit 18 is a recording medium such as an SD card, an SSD (solid state drive), a HDD (hard disk drive), or a memory. The recording unit 18 may be built into the image recording apparatus 1 or may be provided in the image recording apparatus 1 so as to be removable therefrom. In addition, the recording unit 18 may be provided outside the image recording apparatus 1. Note that the encoded image may be transmitted to the outside (e.g., management company of taxis or the like) via a communication unit (not illustrated) instead of being recorded in the recording unit 18.

Figure 4:
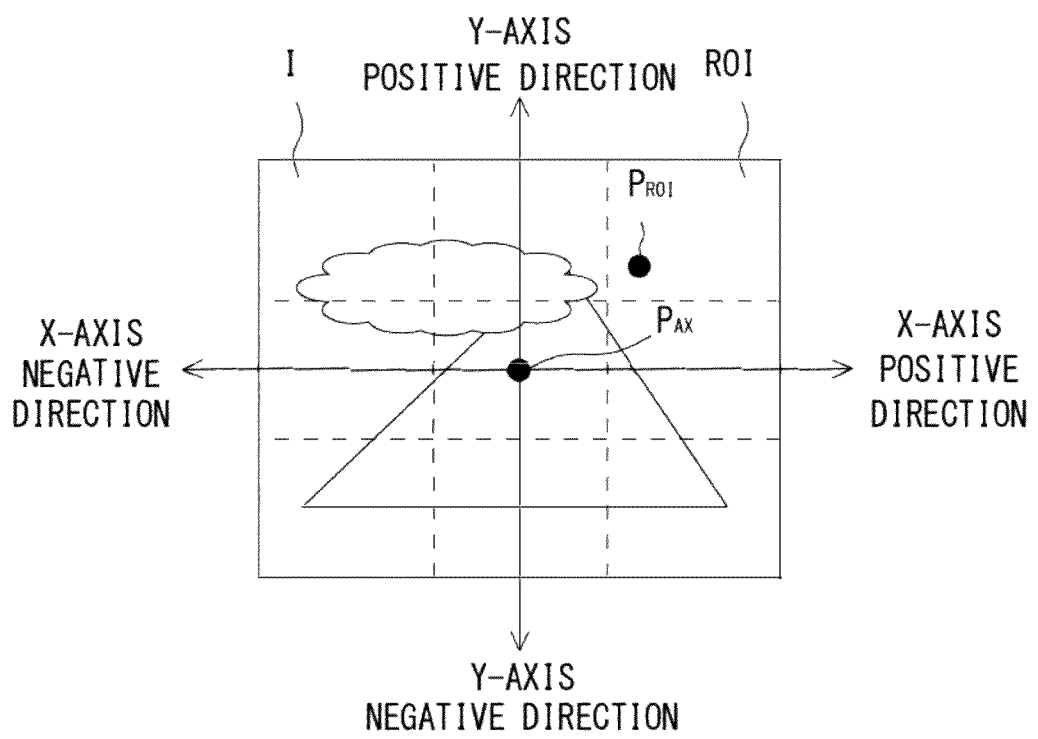
FIG. 4 is an example of an image I of the periphery of an own vehicle V.

The image acquisition unit 11 acquires an image capturing the periphery of the own vehicle V. The periphery of the own vehicle V refers to the front, rear, sides, above, or below the own vehicle V, for example. In FIG. 4, the reference sign I is an example of an image capturing the periphery (e.g., front) of the own vehicle V. Hereinafter, an image capturing the periphery (e.g., front) of the own vehicle V is referred to as an image I. The image I may include only the periphery of the own vehicle V, or may include the periphery of the own vehicle V and the inside of the own vehicle V. The image acquisition unit 11 may include a camera, and may be an input circuit that inputs or receives a signal (image signal) transmitted from the camera.

Figure 2:
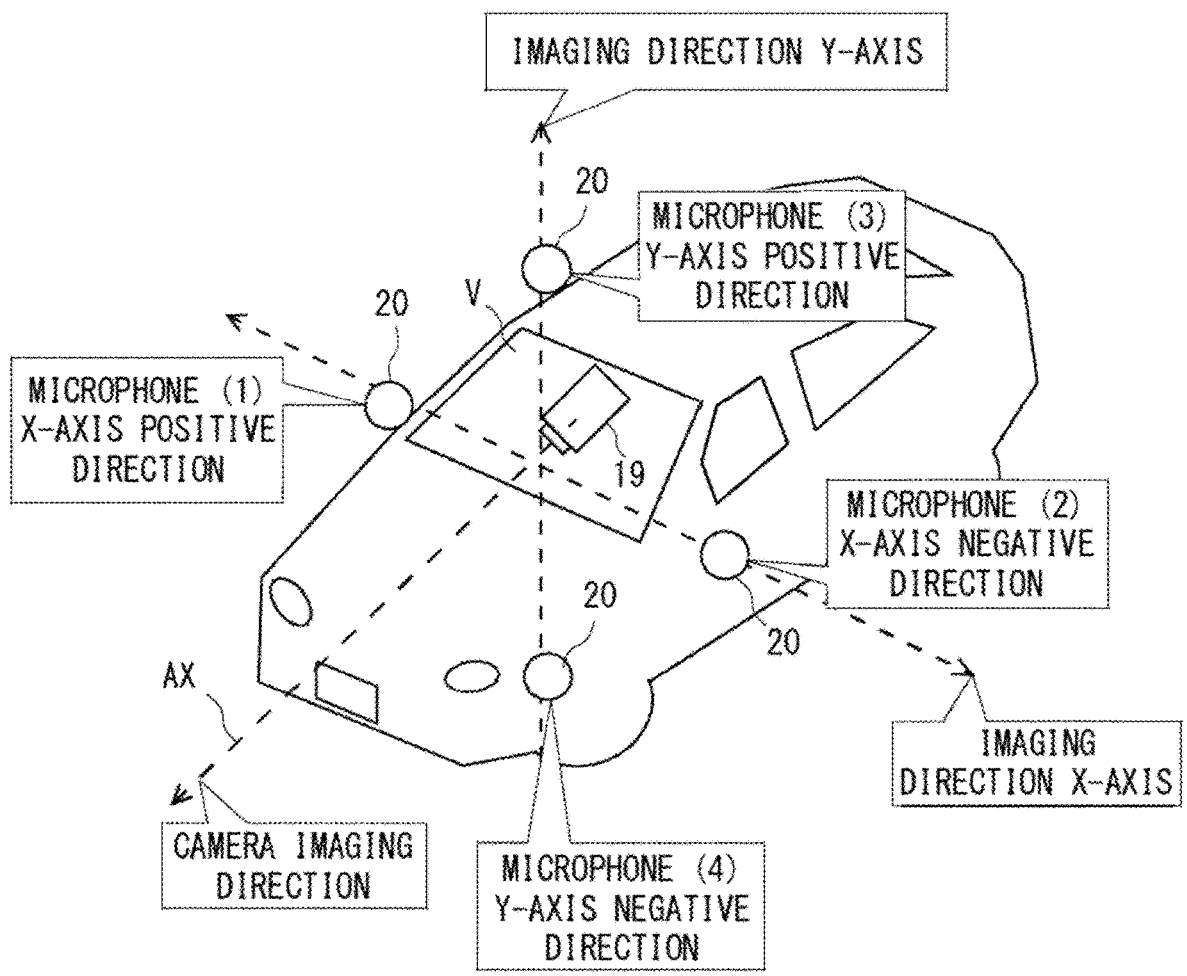
FIG. 2 is an installation example of a camera 19 and a microphone 20.

FIG. 2 is an installation example of a camera 19 and a microphone 20.

As illustrated in FIG. 2, the camera 19 is installed in the interior (e.g., center of vehicle width direction) of the own vehicle V, for example, and images the front of the own vehicle V through the windshield. An optical axis AX of the camera 19 extends in the longitudinal direction of the vehicle. Note that the camera 19 may be installed outside the own vehicle V.

The sound acquisition unit 12 (sound detection unit) acquires (detects) sound around the own vehicle V. The sound acquisition unit 12 may include a microphone, and may be an input circuit that inputs or receives a signal (sound signal) transmitted from the microphone.

As illustrated in FIG. 2, it is desirable that the microphone 20 be installed in each of upper, lower, left, and right areas (e.g., total of four areas) of the own vehicle V. In this case, it is desirable that two microphones 20 be installed symmetrically with respect to the optical axis AX of the camera 19 in the left-right direction, and the other two microphones 20 be installed symmetrically with respect to the optical axis AX of camera 19 in the up-down direction.

The sound acquisition unit 12 acquires sound (sound signal) transmitted from the microphones 20 (microphone array). The sound acquisition unit 12 transmits the volume of the sound acquired from each microphone 20 and information regarding the installation position of each microphone 20 to the sound direction detection unit 13. Moreover, the sound acquisition unit 12 transmits sound (sound signal) transmitted from the microphones 20 (microphone array) to the sound recognition unit 17.

The sound direction detection unit 13 detects a direction of arrival of sound acquired by the sound acquisition unit 12 based on data (delay amount and sound pressure of a plurality of pieces of sound transmitted from microphones 20) and information regarding installation positions of the microphones 20 transmitted from the sound acquisition unit 12. The direction of arrival of sound is detected with reference to $P_{AX}$ (origin on XY coordinates, see FIG. 4) on the image I (acquired by image acquisition unit 11). For example, it is detected from the sound of the two microphones 20 installed in the left-right direction with respect to the optical axis AX of the camera 19 that the direction of arrival of the sound is right of $P_{AX}$ on the image I, and similarly, it is detected from the sound of the two microphones 20 installed in the up-down direction with respect to the optical axis AX of the camera 19 that the direction of arrival of the sound is above $P_{AX}$ on the image I. The direction of arrival of the sound may be detected more specifically according to the difference in delay amount or sound pressure. In FIG. 4, a black dot (coordinate position on XY coordinates) indicated by the reference sign $P_{ROI}$ represents the direction of arrival of the sound (sound source direction) for the image I acquired by the image acquisition unit 11. A specific example of detection of the direction of arrival of sound will be described later.

The direction of arrival of sound may be detected using a known sound source direction determination or estimation technology, such as the beam forming technology using a microphone array. In this case, it is preferable to perform noise reduction (removal or reduction of road noise and wind noise) processing on the sound acquired by the sound acquisition unit 12 as the first stage processing.

The region of interest setting unit 14 performs region of interest setting processing. Region of interest setting processing refers to processing of setting, as a region of interest ROI, a region corresponding to the direction of arrival of sound in the image I acquired by the image acquisition unit 11 based on the direction of arrival of sound detected by the sound direction detection unit 13. As a result, it is possible to dynamically set, as the region of interest ROI, a region corresponding to the direction of arrival of sound (e.g., impact sound, horn, siren/brake sound, and scream/shouting) around the vehicle (accident scene or area where abnormality such as road rage incident occurred). A specific example of setting the region of interest ROI will be described later. The region of interest ROI refers to a region corresponding to the direction of arrival of sound detected by the sound direction detection unit 13 in the image I acquired by the image acquisition unit 11. Note that the region of interest setting unit 14 may set the region of interest ROI based on the direction of arrival of sound detected by the sound direction detection unit 13 when the sound recognition unit 17 (described below) recognizes the sound acquired by the sound acquisition unit 12 to be pre-registered sound.

For example, the region of interest ROI may be one (or more) small regions corresponding to the direction of arrival of sound, among a plurality of rectangular small regions obtained by dividing the image I acquired by the image acquisition unit 11 into 9 (9 divisions of 3×3) or 16 (16 divisions of 4×4), for example. Alternatively, the region of interest ROI may be a region having a shape other than a rectangle (e.g., circle or oval). Also, the region of interest ROI may be the entire image I acquired by the image acquisition unit 11.

The size of the region of interest ROI may be varied according to the volume of sound acquired by the sound acquisition unit 12. For example, when the volume of sound acquired by the sound acquisition unit 12 is high, the sound generation source is more likely to be located near the own vehicle than when the volume is low. Hence, when the volume (detected volume) of sound acquired by the sound acquisition unit 12 is higher than a pre-registered threshold, the size of the region of interest ROI may be increased. Conversely, when the volume (detected volume) of sound acquired by the sound acquisition unit 12 is lower than the pre-registered threshold, the size of the region of interest ROI may be reduced.

The image encoding unit 15 performs image encoding processing (e.g., encoding processing 1 or encoding processing 2). This encoding may be any encoding format such as MPEG, JPEG, H.265, or the like.

Encoding processing 1 refers to encoding processing performed when the region of interest ROI is set. In the encoding processing 1, for the region of interest ROI in the image I acquired by the image acquisition unit 11, processing of allocating more codes than when second encoding processing (described below) is performed (hereinafter referred to as first encoding processing), such as processing of controlling quantization parameters like setting a higher compression ratio and setting a DCT coefficient to increase the code amount, for example, is performed for encoding (first encoding). For regions other than the region of interest ROI in the image I acquired by the image acquisition unit 11, processing of allocating less codes than when the first encoding processing is performed (hereinafter referred to as second encoding processing), such as processing of controlling quantization parameters like setting a lower compression ratio and setting a DCT coefficient to reduce the code amount, for example, is performed for encoding (second encoding). Note that the bit rate for the first encoding processing is higher than the bit rate for the second encoding processing. As a result, the image quality of the region of interest ROI is made higher than that of regions other than the region of interest ROI, so that the direction of arrival of sound (e.g., impact sound, horn, siren/brake sound, and scream/shouting) around the vehicle (accident scene or area where abnormality such as road rage incident occurred) can be recorded with high image quality. Note that by reducing the code amount allocated to regions other than the region of interest, an effect of reducing capacity required for recording can be obtained.

The degree of controlling quantization parameters in the region of interest ROI may be varied according to the volume (detected volume) of sound acquired by the sound acquisition unit 12. For example, when the volume of sound acquired by the sound acquisition unit 12 is high, the accident may have been severe or may have occurred in immediate proximity to the vehicle V. Hence, when the volume (detected volume) of sound acquired by the sound acquisition unit 12 is higher than a pre-registered threshold, the quantization parameters may be controlled to increase the code amount. Conversely, when the volume (detected volume) of sound acquired by the sound acquisition unit 12 is lower than the pre-registered threshold, the quantization parameters may be controlled to reduce the code amount.

Encoding processing 2 refers to encoding processing performed when the region of interest ROI is not set. In the encoding processing 2, the second encoding processing is performed for the (entire) image I acquired by the image acquisition unit 11.

The recording control unit 16 records the image encoded by the image encoding unit 15 in the recording unit 18. Since the region of interest ROI is subjected to the first encoding processing, the direction of arrival of sound (e.g., impact sound, horn, siren/brake sound, and scream/shouting) around the vehicle (accident scene or area where abnormality such as road rage incident occurred) can be recorded with high image quality.

Since regions other than the region of interest ROI and images in which the region of interest ROI is not set are subjected to the second encoding processing, they do not have high image quality. By not unnecessarily increasing image quality in regions other than the region of interest ROI, capacity required for recording can be reduced.

After the sound acquisition unit 12 acquires sound (after detecting sound), when a predetermined period of time passes in a state of not acquiring sound (not detecting sound), the recording control unit 16 restores the quantization parameters of the region of interest ROI and performs second encoding processing. The state of not acquiring sound may be a state of not acquiring (or state of not detecting) sound with volume higher than a pre-registered threshold.

The sound recognition unit 17 performs sound recognition processing on sound acquired by the sound acquisition unit 12, and performs processing of recognizing that the sound is pre-registered sound. Pre-registered sound is an abnormal sound such as a collision sound, a horn, a siren/brake sound, or a scream/shouting, and is included in the sound recognition unit 17 as a recognition dictionary. The sound recognition unit 17 is not an essential component of the first embodiment.

Next, an operation (image recording method) of the image recording apparatus 1 according to the first embodiment will be described using a flowchart illustrated in FIG. 3.

Figure 3:
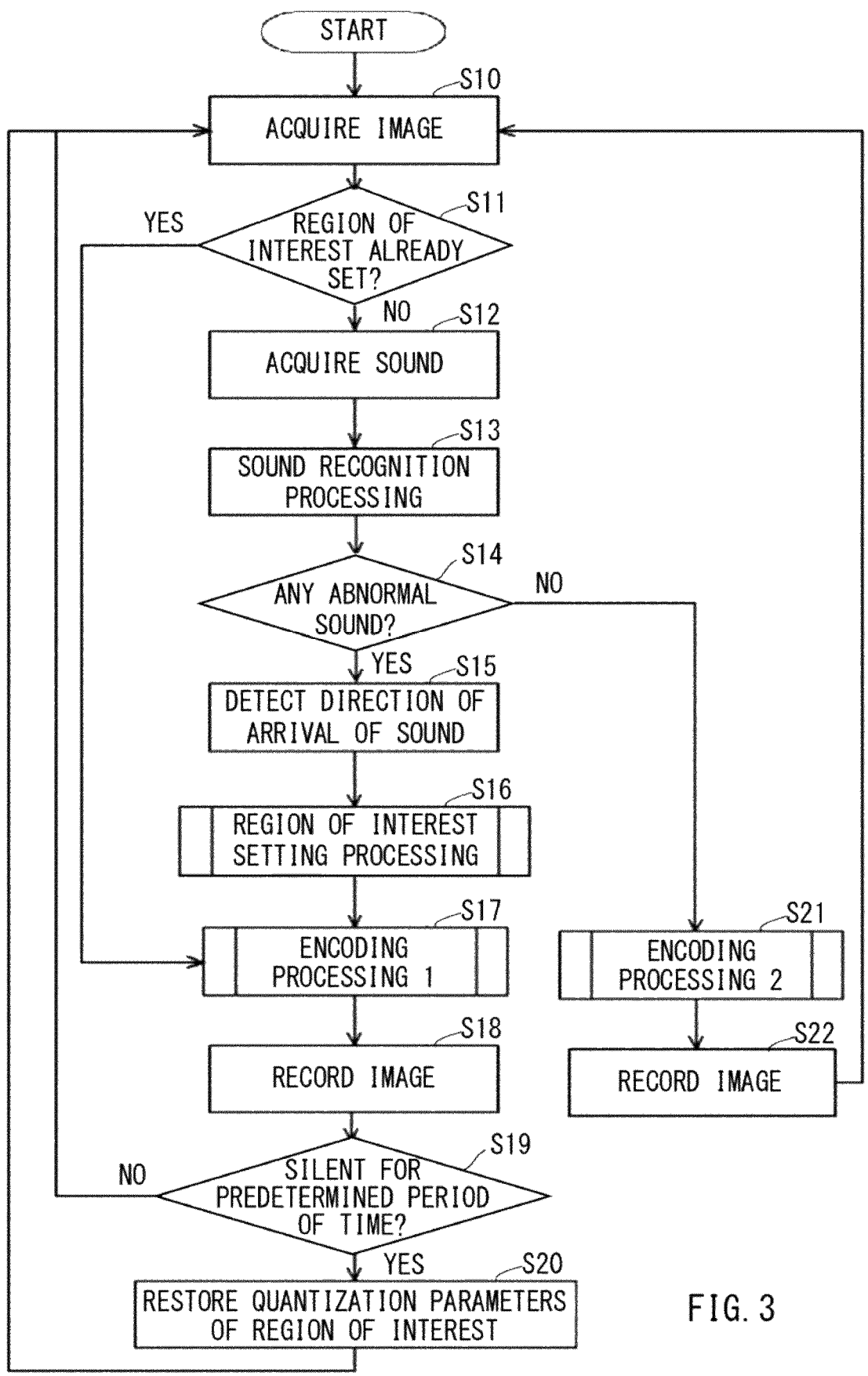
FIG. 3 is a flowchart of an operation (image recording method) of the image recording apparatus 1 according to the first embodiment.

FIG. 3 is a flowchart of the operation (image recording method) of the image recording apparatus 1 according to the first embodiment.

First, the image acquisition unit 11 acquires an image of the periphery of the own vehicle V (step S10). Here, as illustrated in FIG. 4, assume that the image I capturing the front of the own vehicle V has been acquired as the image of the periphery of the own vehicle V. FIG. 4 is an example of the image I of the periphery of the own vehicle V.

Next, it is determined whether the region of interest ROI has been set (step S11).

As a result of the determination in step S11, when it is determined that the region of interest ROI has not been set (step S11: NO), processing of step S12 and subsequent steps is performed.

First, the sound acquisition unit 12 acquires (detects) sound around the own vehicle V (step S12). Specifically, the sound acquisition unit 12 acquires sound (sound signal) transmitted from each microphone 20 (total of four) as sound around the own vehicle V.

Next, the sound recognition unit 17 performs sound recognition processing on the sound acquired by the sound acquisition unit 12 in step S12 (step S13), and determines whether the sound is pre-registered sound (abnormal sound such as collision sound, horn, siren/brake sound, or scream/shouting) (step S14). Note that steps S13 and S14 are not essential processing, and the processing may proceed from step S12 to S15.

When it is determined in step S14 that the sound acquired by the sound acquisition unit 12 in step S12 is not pre-registered sound (abnormal sound) (step S14: NO), the image encoding unit 15 performs encoding processing 2 (step S21).

Here, a specific example of encoding processing 2 will be described.

Figure 5:
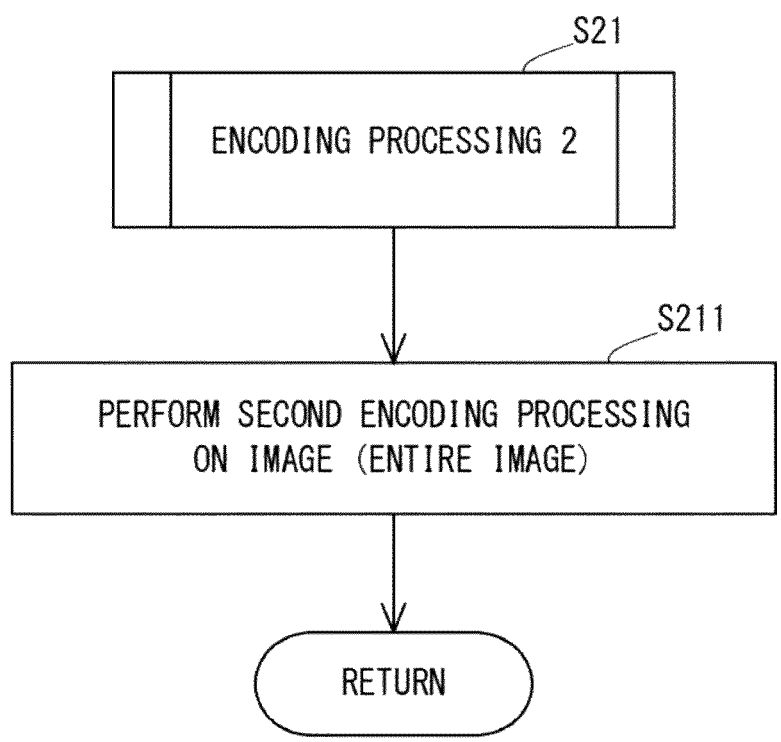
FIG. 5 is a flowchart of a specific example of encoding processing 2.

FIG. 5 is a flowchart of a specific example of the encoding processing 2.

As illustrated in FIG. 5, the recording control unit 16 performs second encoding processing on the image I (entire image) acquired by the image acquisition unit 11 in step S10 (step S211).

The description will be continued by returning to FIG. 3.

When the encoding processing 2 (step S21) is performed, next, the recording control unit 16 records the image encoded in step S21 in the recording unit 18 (step S22). Specifically, the recording control unit 16 records the image obtained by performing the second encoding processing on the image I (entire image) acquired by the image acquisition unit 11 in step S10 in the recording unit 18. Note that the encoded image is recorded as a file.

Next, the processing returns to step S10 and the subsequent processing is repeated.

On the other hand, when it is determined in step S14 that the sound acquired by the sound acquisition unit 12 in step S12 is pre-registered sound (abnormal sound such as collision sound, horn, siren/brake sound, or scream/shouting) (step S14: YES), the processing of step S15 and subsequent steps is performed.

First, the sound direction detection unit 13 detects the direction of arrival of the sound acquired by the sound acquisition unit 12 in step S12 based on data (volume of sound acquired by sound acquisition unit 12 in step S12 and information regarding installation positions of microphones 20) transmitted from the sound acquisition unit 12 (step S15).

Here, a specific example of detection of the direction of arrival of sound will be described.

For example, as illustrated in FIG. 6, assume that the volume (detected volume) of the sound acquired by the sound acquisition unit 12 in step S12 has been acquired. FIG. 6 is an example of volume (detected volume) of sound acquired by the sound acquisition unit 12. In FIG. 6, the X-axis positive direction represents the microphone 20 installed in the right direction with respect to the optical axis AX of the camera 19. Similarly, in FIG. 6, the X-axis negative direction represents the microphone 20 installed in the left direction with respect to the optical axis AX of the camera 19, the Y-axis positive direction represents the microphone 20 installed in the upper direction with respect to the optical axis AX of the camera 19, and the Y-axis negative direction represents the microphone 20 installed in the lower direction with respect to the optical axis AX of the camera 19. In FIG. 6, the numbers 3, 1, 5, and 2 represent the volume of the sound acquired from the microphones 20.

In this case, as illustrated in FIG. 4, the sound direction detection unit 13 detects the direction of arrival of the sound acquired by the sound acquisition unit 12 in step S12

(position of sound detection direction in image I) as 3−1=+2 in the X-axis direction and 5−2=+3 in the Y-axis direction with reference to the center of the image I, that is, $P_{XAX}$. This detected position is represented by a black dot indicated by the reference sign $P_{ROI}$. Hereinafter, the detected position is described as a detected position $P_{ROI}$. In FIG. 4, the X-axis passes through the center of the image I, that is, $P_{AX}$, and extends in the left-right direction. Meanwhile, the Y-axis passes through the center of the image I, that is, $P_{AX}$, and extends in the up-down direction. Alternatively, the direction of arrival of the sound acquired by the sound acquisition unit 12 may be detected by calculating the delay amount of the sound arrival time among the microphones according to the sound arrival times acquired from the microphones 20 and using the sound velocity and distances among the microphones.

Next, the region of interest setting unit 14 performs region of interest setting processing (step S16).

Here, a specific example of the region of interest setting processing (specific example of setting region of interest ROI) will be described.

Figure 7:
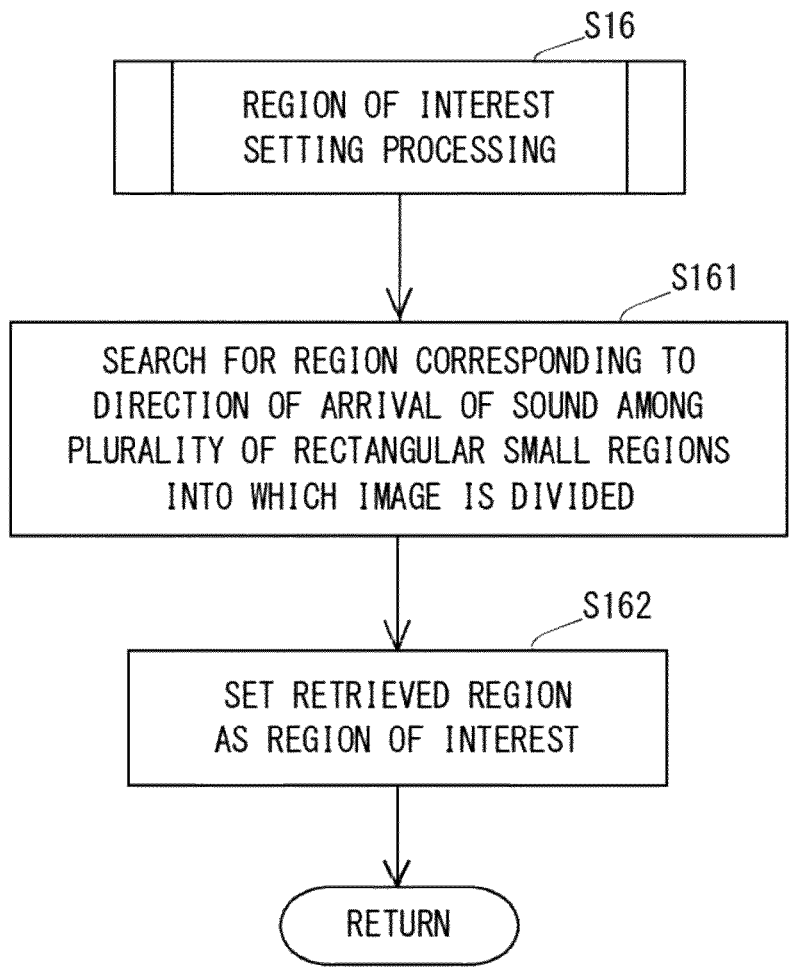
FIG. 7 is a flowchart of a specific example of region of interest setting processing.

FIG. 7 is a flowchart of a specific example of the region of interest setting processing.

As illustrated in FIG. 7, first, the region of interest setting unit 14 searches for a region (region including detected position $P_{ROI}$) corresponding to the direction of arrival of sound (direction of arrival of sound detected in step S15) among a plurality of rectangular small regions (see nine rectangular small regions delimited by dotted line in FIG. 4) into which the image I obtained by the image acquisition unit 11 in step S10 is divided (3×3 nine regions) (step S161).

Here, assume that a small region (small region in upper right corner in FIG. 4) including the detected position $P_{ROI}$ among the plurality of rectangular small regions (see nine rectangular small regions delimited by dotted line in FIG. 4) is retrieved as the region corresponding to the direction of arrival of sound.

Next, the region of interest setting unit 14 sets the region retrieved in step S161 as the region of interest ROI (step S162).

Here, assume that the small region in the upper right corner including the detected position $P_{ROI}$ retrieved in step S161 is set as the region of interest ROI.

As described above, according to the region of interest setting processing, it is possible to dynamically set, as the region of interest ROI, a region corresponding to the direction of arrival of sound (e.g., impact sound, horn, siren/brake sound, scream/shouting) around the vehicle (accident scene or area where abnormality such as road rage incident occurred).

Note that the size of the region of interest ROI may be varied by the volume of the sound acquired by the sound acquisition unit 12 in step S12. For example, when the volume of sound acquired by the sound acquisition unit 12 is high, the sound generation source is more likely to be located near the own vehicle than when the volume is low. Hence, when the volume (detected volume) of sound acquired by the sound acquisition unit 12 in step S12 is higher than a pre-registered threshold, the size of the region of interest ROI may be increased.

Conversely, when the volume (detected volume) of sound acquired by the sound acquisition unit 12 in step S12 is lower than the pre-registered threshold, the size of the region of interest ROI may be reduced.

The description will be continued by returning to FIG. 3.

When the region of interest ROI is set (step S16), next, the image encoding unit 15 performs the encoding processing 1 (step S17).

Here, a specific example of the encoding processing 1 will be described.

Figure 8:
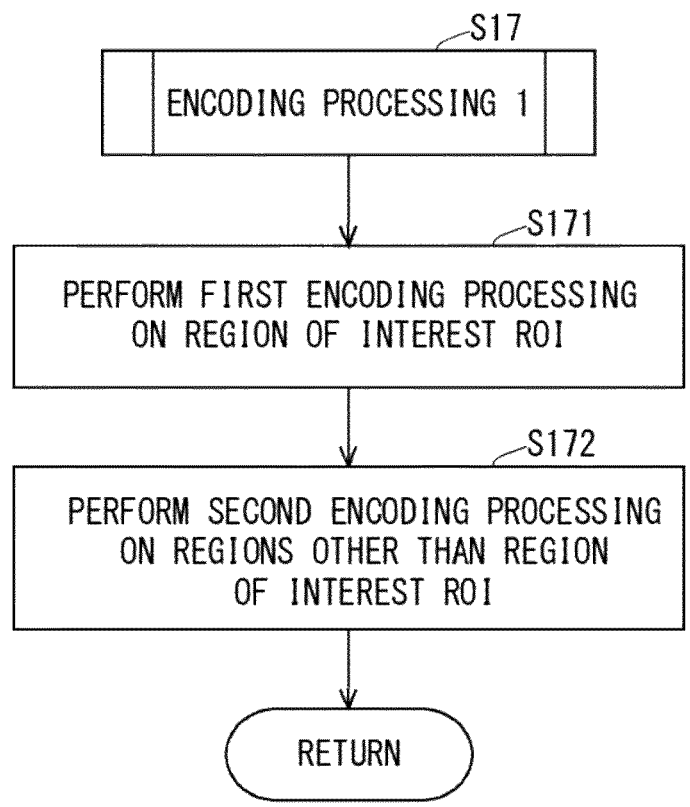
FIG. 8 is a flowchart of a specific example of encoding processing 1.

FIG. 8 is a flowchart of a specific example of the encoding processing 1.

As illustrated in FIG. 8, first, the image encoding unit 15 performs first encoding processing on the region of interest ROI in the image I acquired by the image acquisition unit 11 in step S10 (step S171). On the other hand, the image encoding unit 15 performs second encoding processing on regions other than the region of interest ROI in the image I acquired by the image acquisition unit 11 in step S10 (step S172).

Note that the degree of controlling the quantization parameters may be varied according to the volume (detected volume) of sound acquired by the sound acquisition unit 12 in step S12. For example, when the volume of the sound acquired by the sound acquisition unit 12 is high, the accident may have been severe. Hence, when the volume (detected volume) of sound acquired by the sound acquisition unit 12 in step S12 is higher than a pre-registered threshold, the quantization parameters may be controlled to increase the allocated code amount.

Conversely, when the volume (detected volume) of sound acquired by the sound acquisition unit 12 in step S12 is lower than the pre-registered threshold, the quantization parameters may be controlled to reduce the allocated code amount.

The description will be continued by returning to FIG. 3.

When the encoding processing 1 (step S17) is performed, next, the recording control unit 16 records the image encoded by the image encoding unit 15 in the recording unit 18 (step S18). Specifically, the recording control unit 16 performs the first encoding processing for the region of interest ROI in the image I and records it in recording unit 18. On the other hand, the recording control unit 16 performs the second encoding processing on regions other than the region of interest ROI in the image I and records them in the recording unit 18.

As described above, since the image quality of the region of interest ROI is made higher than that of regions other than the region of interest ROI, the direction of arrival of sound (e.g., impact sound, horn, siren/brake sound, and scream/shouting) around the vehicle (accident scene or area where abnormality such as road rage incident occurred) can be recorded with high image quality.

Next, it is determined whether it is silent for a predetermined period of time (step S19). Silent refers to a status where the volume is a certain level or lower (e.g., status where volume is lower than predetermined threshold).

When it is determined in step S19 that it is not silent for a predetermined period of time (step S19: NO), the processing returns to step S10 and the subsequent processing is repeated.

Next, it is determined whether the region of interest ROI has been set (step S11).

Here, since the region of interest ROI has been set, it is determined that the region of interest ROI has been set (step S11: YES), and processing of step S17 and subsequent steps is performed.

That is, the processing of step S10, step S11: YES, and steps S17 and S18 are repeated until it is determined in step S19 that it is silent for a predetermined period of time.

When it is determined in step S19 that it is silent for a predetermined period of time (step S19: YES), that is, after the sound acquisition unit 12 acquires sound (after detecting sound), when a predetermined period of time passes in a state of not acquiring sound (not detecting sound), the recording control unit 16 restores the quantization parameters of the region of interest ROI (step S20). That is, the setting of the region of interest ROI is cancelled.

Next, the processing returns to step S10 and the subsequent processing is repeated.

Note that when playing back an image recorded in the recording unit 18, a display (e.g., display of surrounding region of interest ROI in specific color) for identifying the region of interest ROI may be displayed during playback of the image.

As has been described, according to the first embodiment, since the sound direction detection unit 13 is provided, it is possible to detect the direction of arrival of sound around the own vehicle. Additionally, since the region of interest setting unit 14 is provided, it is possible to dynamically set a region corresponding to the detected direction of arrival of sound as the region of interest ROI. Moreover, since the image encoding unit 15 is provided, it is possible to perform first encoding processing on the region of interest ROI in the image I, and perform second encoding processing on regions other than the region of interest ROI in the image I.

As a result, the direction of arrival of sound (e.g., impact sound, horn, siren/brake sound, and scream/shouting) around the vehicle (accident scene or area where abnormality such as road rage incident occurred) can be set as the region of interest ROI to assign higher image quality than regions other than the region of interest ROI. Accordingly, the accident scene or the area where abnormality such as a road rage incident occurred can be recorded more clearly.

Next, a modified example will be described. In contrast to the first embodiment which sets a region of interest and regions other than the region of interest separately within an image according to the direction of arrival of sound, in the modified example, the entire image is set as a region of interest when the direction of arrival of sound is within the angle of view of the image.

Figure 9:
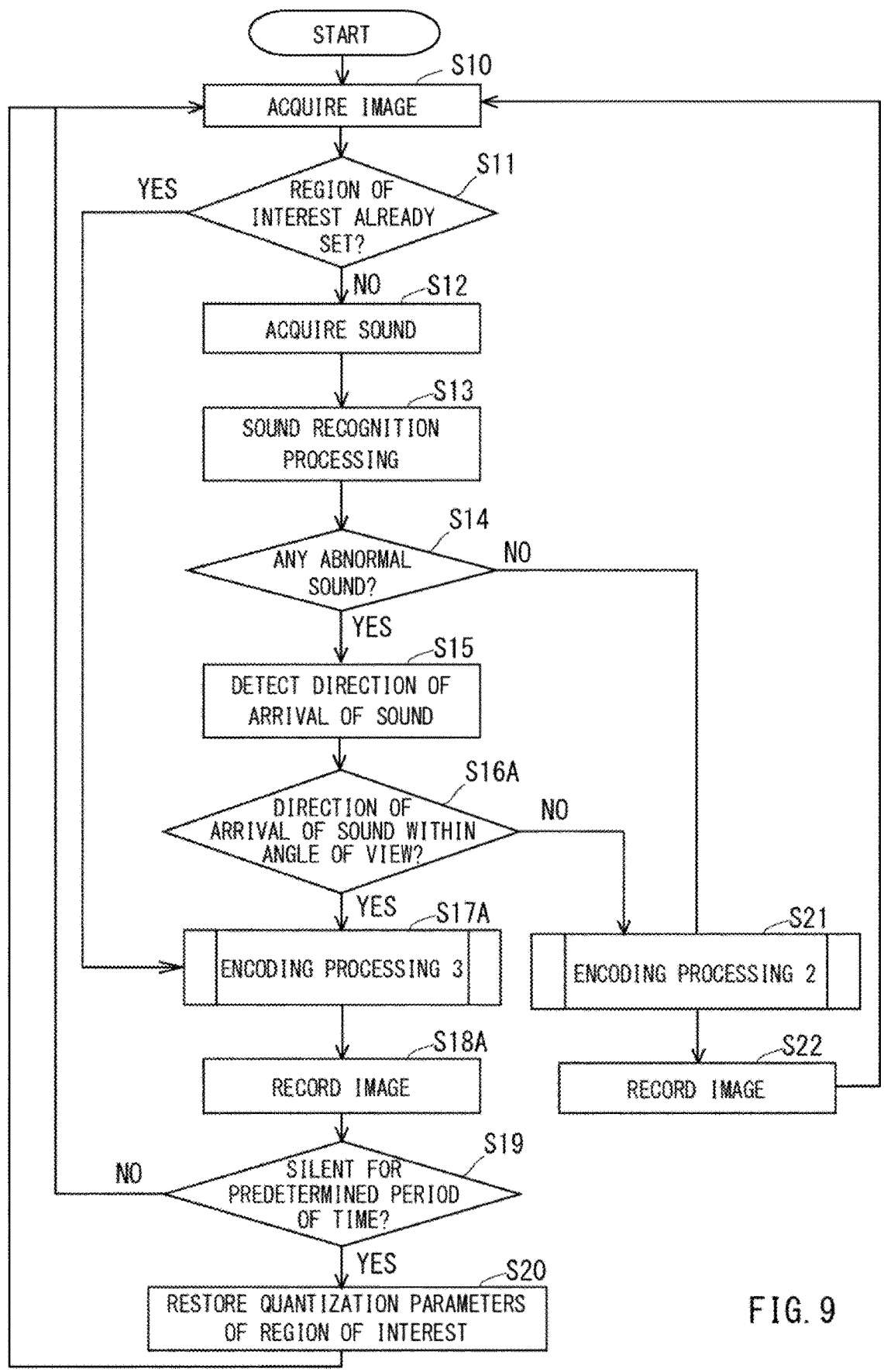
FIG. 9 is a flowchart of another operation (modified example of image recording method) of the image recording apparatus 1.

FIG. 9 is a flowchart of another operation (modified example of image recording method) of the image recording apparatus 1. FIG. 9 corresponds to FIG. 3 with steps S16 to S18 replaced with steps S16A to S18A.

Hereinafter, steps S16A to S18A which are differences from FIG. 3 will mainly be described.

When a sound direction detection unit 13 detects a direction of arrival of sound acquired by a sound acquisition unit 12 in step S12 (step S15), next, it is determined whether the detected direction of arrival of sound is within the angle of view of a camera 19 (step S16A).

When it is determined in step S16A that the direction of arrival of sound is not within the angle of view of the camera 19 (step S16A: NO), that is, when the direction of arrival of sound is out of the angle of view of the camera 19, processing of steps S21 and S22 is performed. That is, an image encoding unit 15 performs encoding processing 2 (step S21), and a recording control unit 16 records the image encoded in step S21 in a recording unit 18 (step S22).

On the other hand, when it is determined in step S16A that the direction of arrival of sound is within the angle of view of the camera 19 (step S16A: YES), the image encoding unit 15 performs encoding processing 3 (step S17A). In the encoding processing 3, first encoding processing is performed on an entire image I acquired by an image acquisition unit 11 in step S10.

Next, the recording control unit 16 records the image encoded in step S17A in the recording unit 18 (step S18A). Note that the encoded image is recorded as a file.

According to the present modified example, when it is determined that the direction of arrival of sound is within the angle of view of the camera 19 (step S16A: YES), the first encoding processing is performed on the entire image I. On the other hand, when it is determined that the direction of arrival of sound is out of the angle of view of the camera 19 (step S16A: NO), the second encoding processing is performed on the entire image I.

As a result, when the direction of arrival of sound (e.g., impact sound, horn, siren/brake sound, and scream/shouting) around the vehicle (accident scene or area where abnormality such as road rage incident occurred) is within the angle of view of the camera 19, in other words, when the direction of arrival of sound can be imaged, the captured image can be recorded with high image quality and can be recorded even more clearly in the case of an accident scene or when abnormality such as a road rage incident occurs.

Second Embodiment

Figure 10:
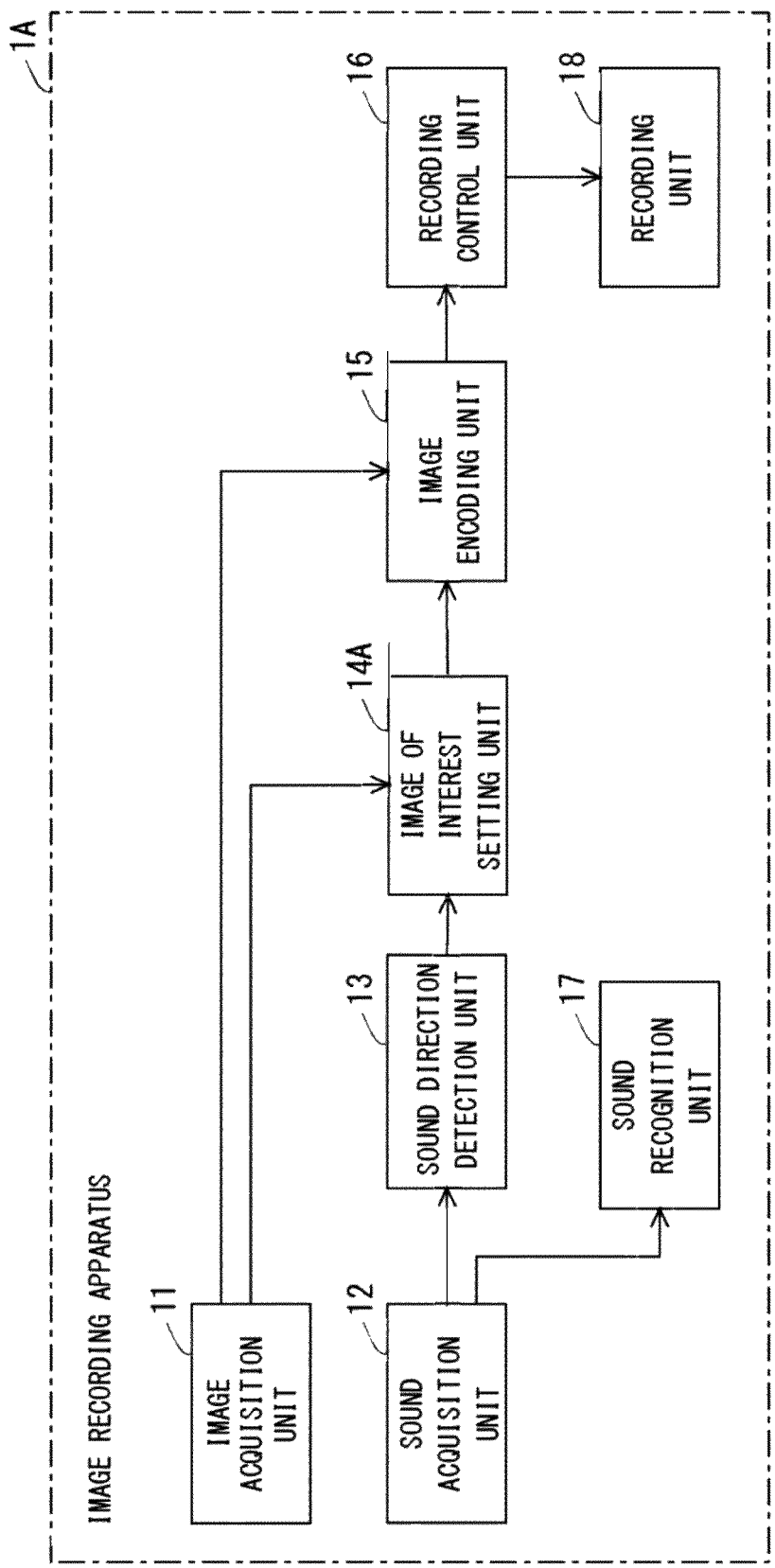
FIG. 10 is a block diagram illustrating a configuration example of an image recording apparatus 1A according to a second embodiment.

FIG. 10 is a block diagram illustrating a configuration example of an image recording apparatus 1A according to a second embodiment.

FIG. 10 corresponds to FIG. 1 with the region of interest setting unit 14 replaced with an image of interest setting unit 14A.

The image of interest setting unit 14A performs image of interest setting processing. Image of interest setting processing refers to processing of setting, as an image of interest, an image captured by a camera 19 capturing a direction of arrival of sound among a plurality of images I acquired by an image acquisition unit 11 including a plurality of cameras 19 based on the direction of arrival of sound detected by a sound direction detection unit 13. The image of interest setting unit 14A may set an entire image I captured by a single camera that substantially coincides with the direction of arrival of sound as the image of interest, or may set the entirety of a plurality of images I captured by two or more cameras near the direction of arrival of sound as the image of interest. An image of interest refers to an image corresponding to the direction of arrival of sound detected by the sound direction detection unit 13 among the images I (e.g., image captured by four cameras 19) acquired by the image acquisition unit 11.

Figure 11:
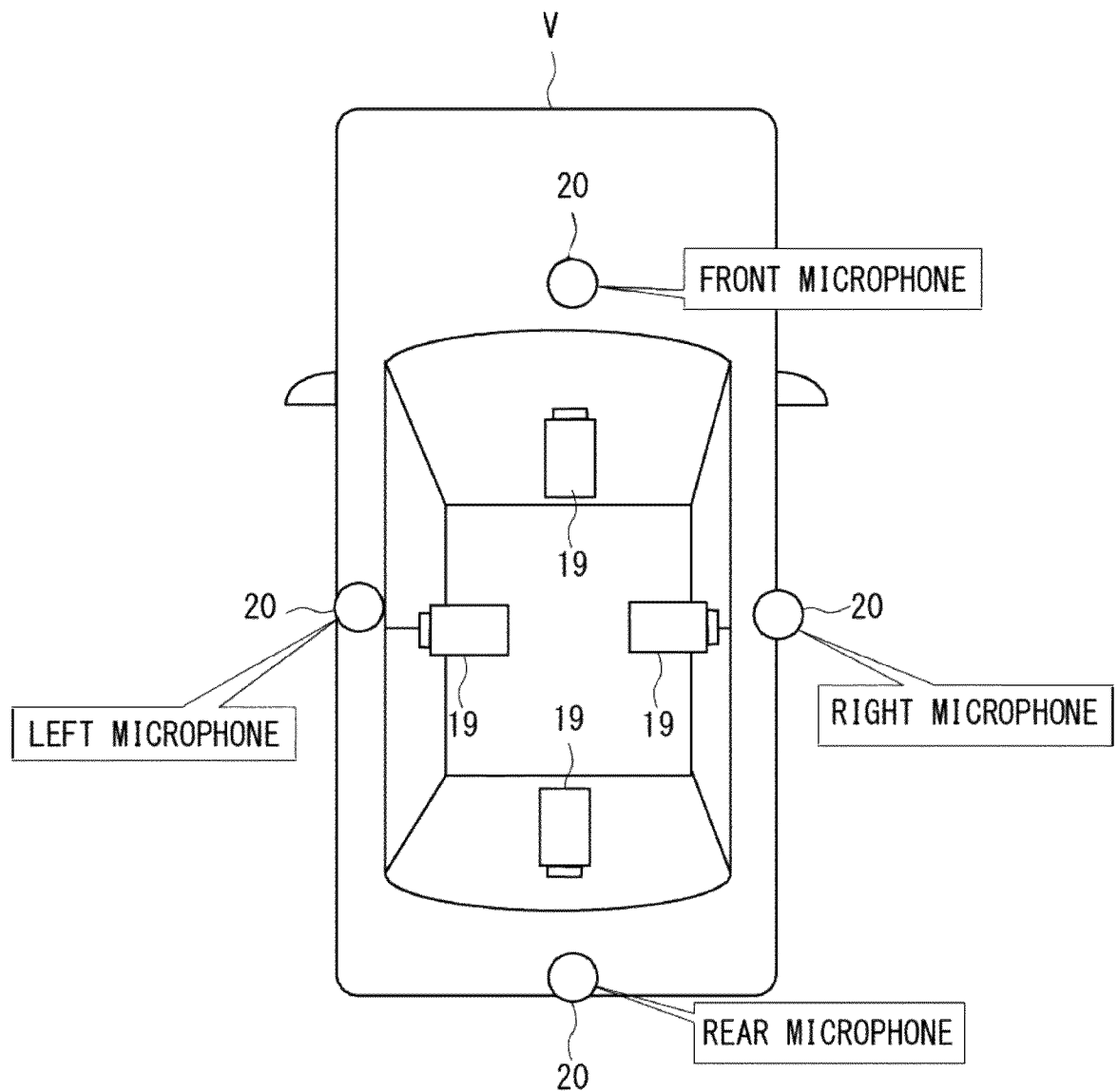
FIG. 11 is another installation example of the camera 19 and the microphone 20.

FIG. 11 is another installation example of the camera 19 and a microphone 20.

As illustrated in FIG. 11, a total of four cameras 19 are installed to image the front, rear, left side, and right side of an own vehicle V. Additionally, a total of four microphones 20 corresponding to the cameras 19 are installed.

Next, an operation (image recording method) of the image recording apparatus 1A according to the second embodiment will be described using the flowchart illustrated in FIG. 12.

Figure 12:
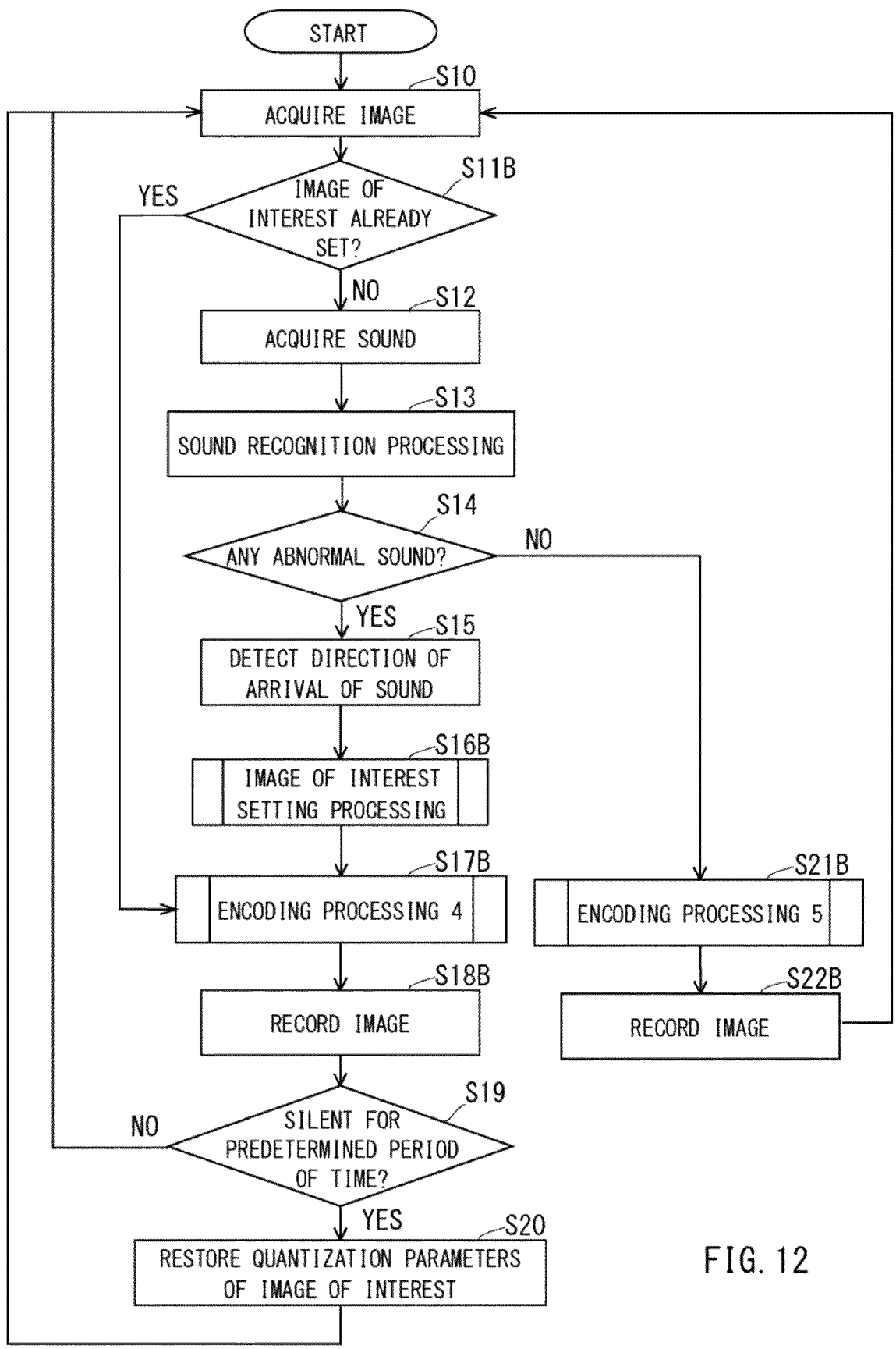
FIG. 12 is a flowchart of an operation (image recording method) of the image recording apparatus 1A according to the second embodiment.

FIG. 12 is a flowchart of the operation (image recording method) of the image recording apparatus 1A according to the second embodiment. FIG. 12 corresponds to FIG. 3 with steps S11, S16 to 18, S21, and S22 replaced with steps S11B, S16B to 18B, S21B, and S22B.

First, the image acquisition unit 11 acquires an image of the periphery of the own vehicle V (step S10). Here, assume that images I (total of four) capturing the periphery (front, rear, left side, and right side) of the own vehicle V have been acquired from the cameras 19 as images of the periphery of the own vehicle V.

Next, it is determined whether an image of interest has been set (step S11B).

When it is determined in step S11B that the image of interest has not been set (step S11B: NO), the processing of step S12 and subsequent steps is performed.

First, a sound acquisition unit 12 acquires (detects) sound around the own vehicle V (step S12). Specifically, the sound acquisition unit 12 acquires sound (sound signal) transmitted from the microphones 20 (total of four) as sound around the own vehicle V.

Next, a sound recognition unit 17 performs sound recognition processing on sound acquired by the sound acquisition unit 12 in step S12 (step S13), and determines whether the sound is pre-registered sound (abnormal sound such as collision sound, horn, siren/brake sound, or scream/shouting) (step S14).

When it is determined in step S14 that the sound acquired by the sound acquisition unit 12 in step S12 is not pre-registered sound (abnormal sound) (step S14: NO), an image encoding unit 15 performs encoding processing 5 (step S21B).

Encoding processing 5 refers to performing second encoding processing on the total of four images I (entirety) acquired by the image acquisition unit 11 in step S10.

Next, the recording control unit 16 records the image encoded in step S21B in the recording unit 18 (step S22B). Specifically, the recording control unit 16 records the image obtained by encoding the total of four images I (entirety) acquired by the image acquisition unit 11 in step S10 in the recording unit 18. Note that the encoded image is recorded as a file.

Next, the processing returns to step S10 and the subsequent processing is repeated.

On the other hand, when it is determined in step S14 that the sound acquired by the sound acquisition unit 12 in step S12 is pre-registered sound (abnormal sound such as collision sound, horn, siren/brake sound, or scream/shouting) (step S14: YES), the processing of step S15 and subsequent steps is performed.

First, the sound direction detection unit 13 detects the direction of arrival of the sound acquired by the sound acquisition unit 12 in step S12 based on the data transmitted from the sound acquisition unit 12 (delay amount and sound pressure of a plurality of pieces of sound transmitted from microphones 20) and information regarding the installation position of each microphone 20 (step S15).

Specifically, the sound direction detection unit 13 detects the direction in which the microphone 20 with the highest volume among the volumes of sound acquired from the microphones 20 is installed as the direction of arrival of sound. Alternatively, the sound direction detection unit 13 detects the direction in which the microphone 20 with the fastest arrival time of the sound acquired from the microphones 20 is located as the direction of arrival of sound. In addition, as shown in the first embodiment, the direction of arrival of sound based on the difference in sound volume and delay amount may be detected.

Next, the image of interest setting unit 14A performs image of interest setting processing (step S16B).

Here, a specific example of the image of interest setting processing will be described.

Figure 13:
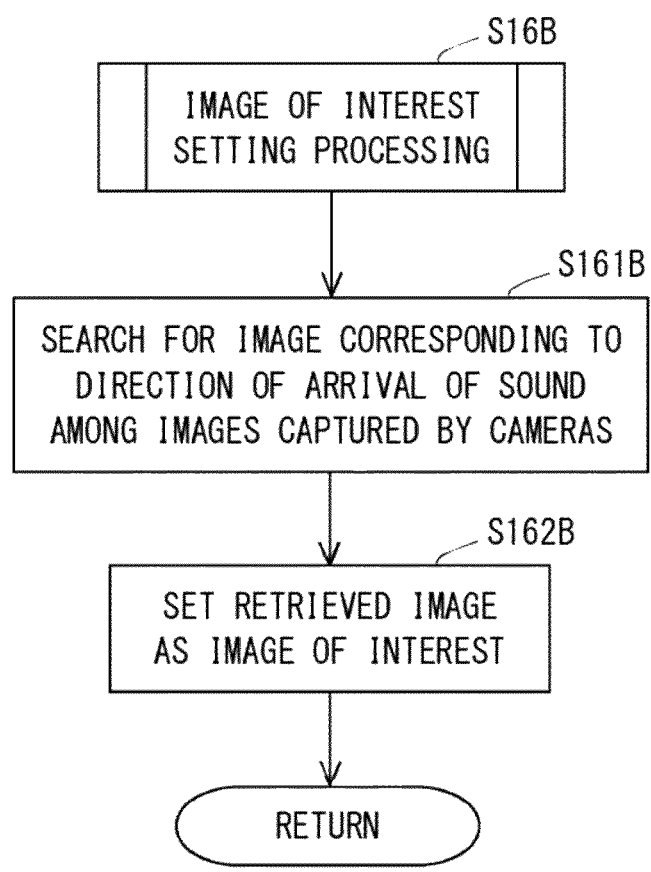
FIG. 13 is a flowchart of a specific example of image of interest setting processing.

FIG. 13 is a flowchart of a specific example of the image of interest setting processing.

As illustrated in FIG. 13, first, the image of interest setting unit 14A searches for an image corresponding to the direction of arrival of sound detected by the sound direction detection unit 13 among a plurality of images I (images captured by cameras 19) acquired by the image acquisition unit 11 (step S161B).

Next, the image of interest setting unit 14B sets the image retrieved in step S161B as the image of interest (step S162B). Note that at this time, as shown in the modified example of the first embodiment, the image of interest may be set to an image whose direction of arrival of sound is within the angle of view.

As describe above, according to the image of interest setting processing, it is possible to dynamically set, as the image of interest, an image corresponding to the direction of arrival of sound (e.g., impact sound, horn, siren/brake sound, and scream/shouting) around the vehicle (accident scene or area where abnormality such as road rage incident occurred).

The description will be continued by returning to FIG. 12.

When the image of interest is set (step S16B), next, the image encoding unit 15 performs encoding processing 4 (step S17B). Specifically, the image encoding unit 15 performs first encoding processing on the entire image of interest among the four images captured by the cameras 19, and on the other hand, performs second encoding processing on images other than the image of interest among the four images captured by the cameras 19.

Next, the recording control unit 16 records the image encoded by the image encoding unit 15 in the recording unit 18 (step S18B). At this time, the encoded image is recorded as a file.

As described above, since the image quality of the image of interest is made higher than that of images other than the image of interest, the direction of arrival of sound (e.g., impact sound, horn, siren/brake sound, and scream/shouting) around the vehicle (accident scene or area where abnormality such as road rage incident occurred) can be recorded with high image quality.

Next, it is determined whether it is silent for a predetermined period of time (step S19).

When it is determined in step S19 that it is not silent for a predetermined period of time (step S19: NO), the processing returns to step S10 and the subsequent processing is repeated.

Next, it is determined whether the image of interest has been set (step S11B).

Here, since the image of interest has been set, it is determined that the image of interest has been set (step S11B: YES), and processing of step S17B and subsequent steps is performed.

That is, the processing of step S10, step S11B: YES, and steps S17B and S18B are repeated until it is determined in step S19 that it is silent for a predetermined period of time.

When it is determined in step S19 that it is silent for a predetermined period of time (step S19: YES), that is, after the sound acquisition unit 12 acquires sound (after detecting sound), when a predetermined period of time passes in a state of not acquiring sound (not detecting sound), the recording control unit 16 restores the quantization parameters of the image of interest (step S20). That is, the setting of the image of interest is cancelled.

Next, the processing returns to step S10 and the subsequent processing is repeated.

As has been described, according to the second embodiment, since the sound direction detection unit 13 is provided, it is possible to detect the direction of arrival of sound around the own vehicle. Additionally, since the image of interest setting unit 14A is provided, it is possible to dynamically set an image corresponding to the detected direction of arrival of sound as the image of interest. Moreover, since the image encoding unit 15 is provided, it is possible to perform first encoding processing on the image of interest among a plurality of images I, and perform second encoding processing on images other than the image of interest among the plurality of images I.

As a result, the direction of arrival of sound (e.g., impact sound, horn, siren/brake sound, and scream/shouting) around the vehicle (accident scene or area where abnormality such as road rage incident occurred) can be set as the image of interest to assign higher image quality than images other than the image of interest. Accordingly, the accident scene or the area where abnormality such as a road rage incident occurred can be recorded more clearly.

A hardware configuration example of a control apparatus of the image recording apparatuses according to the first and second embodiments will be described with reference to FIG. 14.

Figure 14:
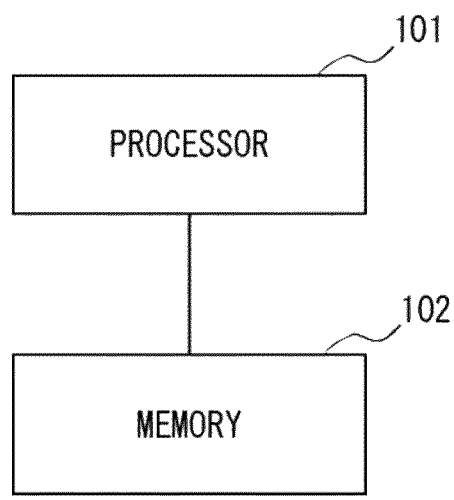
FIG. 14 is a hardware configuration example of a control apparatus of the image recording apparatuses according to the first and second embodiments.

FIG. 14 is a hardware configuration example of the control apparatus of the image recording apparatuses according to the first and second embodiments.

In FIG. 14, the image recording apparatus includes a processor 101 and a memory 102. The processor 101 may be, for example, a microprocessor, a micro processing unit (MPU), or a central processing unit (CPU). The processor 101 may include a plurality of processors. The memory 102 includes a combination of a volatile memory and a nonvolatile memory. The memory 102 may include a storage located away from the processor 101. In this case, the processor 101 may access the memory 102 via an I/O interface (not illustrated).

In addition, each apparatus in the above embodiment may be formed of hardware or software, or both, and may be formed of one hardware or software, or a plurality of hardware or software. The functions (processing) of each apparatus in the above embodiment may be implemented by a computer. For example, a program for performing the operations in the embodiment may be stored in the memory 102, and each function may be implemented by executing the program stored in the memory 102 by the processor 101.

The program described above can be stored and provided to a computer using any type of non-transitory computer readable media. Non-transitory computer readable media include any type of tangible recording media. Examples of non-transitory computer readable media include magnetic recording media (e.g., floppy disks, magnetic tapes, and hard disk drives), optical magnetic recording media (e.g. magneto-optical disks), CD-ROM (read only memory), CD-R, CD-R/W, and semiconductor memories (e.g., mask ROM, PROM (programmable ROM), EPROM (erasable PROM), flash ROM, and RAM (random access memory)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The present embodiment is not limited to the above embodiments, but can be modified as needed without departing from the gist of the embodiment.

The present embodiment can be used as an image recording apparatus and an image recording method that can detect a direction of arrival of sound around a vehicle and dynamically set a region corresponding to the detected direction of arrival of sound as a region of interest. In addition, the present embodiment can be used as an image recording apparatus and an image recording method that can detect a direction of arrival of sound around a vehicle and dynamically set an image corresponding to the detected direction of arrival of sound as an image of interest.

What is claimed is:

1. An image recording apparatus comprising:
   an image acquisition unit configured to acquire an image capturing a periphery of a vehicle;
   a sound acquisition unit configured to acquire sound of the periphery of the vehicle;
   a sound direction detection unit configured to detect a direction of arrival of the sound;
   a region of interest setting unit configured to set a region corresponding to the direction of arrival of the sound among a plurality of regions obtained by dividing the image as a region of interest; and
   an image encoding unit configured to perform first encoding processing on the region of interest in the image and perform second encoding processing on a region other than the region of interest in the image.

2. The image recording apparatus according to claim 1, further comprising a sound recognition unit configured to recognize that sound acquired by the sound acquisition unit is pre-registered sound, wherein
   when it is recognized that the sound acquired by the sound acquisition unit is pre-registered sound, the region of interest setting unit sets a region of interest in the image corresponding to the direction of arrival of the sound.

3. The image recording apparatus according to claim 1, wherein a size of the set region of interest is set to be larger when volume of sound acquired by the sound acquisition unit is higher than a predetermined threshold, than when the volume is lower than the threshold.

4. An image recording apparatus comprising:
   an image acquisition unit configured to acquire a plurality of images capturing a periphery of a vehicle;
   a sound acquisition unit configured to acquire sound of the periphery of the vehicle;
   a sound direction detection unit configured to detect a direction of arrival of the sound;
   an image of interest setting unit configured to set one or more images in which the direction of arrival of sound is included within an angle of view of the image among the plurality of images as an image or images of interest; and
   an image encoding unit configured to perform first encoding processing on the image or the images of interest among the plurality of images and perform second encoding processing on images other than the image or the images of interest among the plurality of images.

5. The image recording apparatus according to claim 4, further comprising a sound recognition unit configured to recognize that sound acquired by the sound acquisition unit is pre-registered sound, wherein
   when it is recognized that the sound acquired by the sound acquisition unit is pre-registered sound, the image of interest setting unit sets an image or the images of interest corresponding to the direction of arrival of the sound.

6. An image recording method comprising:
   an image acquisition step of acquiring a plurality of images capturing a periphery of a vehicle;
   a sound acquisition step of acquiring sound of the periphery of the vehicle;
   a sound direction detection step of detecting a direction of arrival of the sound;
   a region of interest setting step of setting one or more regions corresponding to the direction of arrival of the sound among the plurality of regions obtained by dividing the image, as a region or regions of interest; and an image encoding step of performing first encoding processing on the region of interest in the image and performing second encoding processing a region other than the region of interest in the image.

* * * * *